Jan. 15, 1935.  R. P. LANSING  1,987,833
DRIVING MECHANISM
Filed Nov. 9, 1931

INVENTOR
Raymond P. Lansing
BY
ATTORNEY

Patented Jan. 15, 1935

1,987,833

UNITED STATES PATENT OFFICE 1,987,833

DRIVING MECHANISM

Raymond P. Lansing, Montclair, N. J., assignor, by mesne assignments, to Eclipse Aviation Corporation, East Orange, N. J., a corporation of New Jersey Application November 9, 1931, Serial No. 574,015

22 Claims. (Cl. 192—103)

This invention relates to driving mechanism and more particularly to driving mechanism having means for yieldably coupling a driving and driven member.

One object of the present invention is to provide a driving mechanism in which novel means are employed for effecting a driving connection of limited torque capacity between the driving and driven members.

Another object of the invention is to provide a driving mechanism in which novel means are employed to regulate the torque capacity of the driving connection and to control such torque capacity in such a manner as to provide a definite mathematical relation between the torque capacity and the speed with which the driving mechanism is rotated.

A further object of the invention is to provide in a driving mechanism of the above character, employing driving connections having engaging friction surfaces, novel means for maintaining the torque capacity of such driving connection constant at any given speed regardless of any change occurring in the coefficient of friction of such driving surfaces.

Another object is to provide a friction clutch mechanism of the foregoing character wherein any tendency for the torque capacity of the clutch to vary will automatically produce a counteracting tendency operating to maintain the torque at its normal predetermined value.

Still another object is to provide in a friction clutch mechanism of the foregoing character, novel speed responsive means for varying the torque capacity of the clutch in definite mathematical relation to the variations in speed of rotation.

These and other objects and advantages to be derived from the use of the invention herein disclosed will become apparent upon an inspection of the following specification, reference being had to the accompanying drawing, wherein the preferred embodiment of the invention is disclosed. It is to be understood, however, that the drawings are for the purpose of illustration only and are not designed as a definition of the limits of the invention, reference being had for such purpose to the appended claims.

In the drawing,

Fig. 4 is a fragmentary view similar to Fig. 1 but showing certain of the members in a different position.

Figure 1:
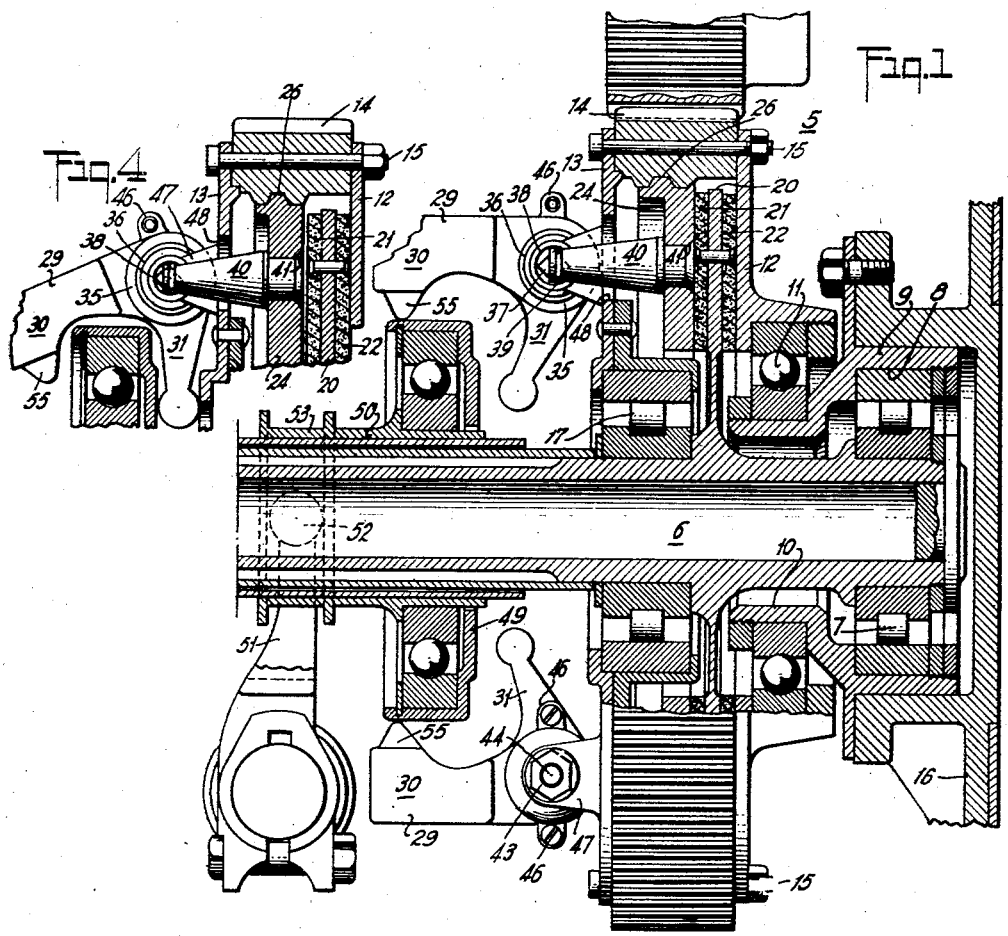
Fig. 1 is an axial section of a driving mechanism embodying the present invention.

Referring to the drawing, and more particularly to Fig. 1, there is disclosed therein one form of driving mechanism embodying the present invention, in which form a gear and clutch assembly 5 constitutes the driven member, and a hollow shaft 6 the driving member, the latter being shown as extending centrally through the gear assembly 5 and rotatable in a bearing 7 received in a recess 8 of a supporting housing 9, which is in turn supported by a main housing 16, the former having an extension 10 adapted to receive bearing means 11 rotatably supporting the disc or plate 12 closing one side of the driven member 5, the other side being closed by a similar disc or plate 13, the plates 12 and 13 being secured to the toothed annulus gear 14 by suitable means such as the bolts 15, while the plate 13 is adapted to be rotatably supported upon shaft 6 by bearing 17.

It will be understood, of course, that the teeth of the gear 14 provide means for operative connection with any suitable device to be driven, to which the novel driving mechanism of the present invention may be applied, and it will be further understood that in place of such a lateral drive from the driven member 14, a coaxial or concentric drive may be employed. For the purpose of illustration, however, the driven member is shown as adapted to be engaged by a spur gear or pinion of the type frequently used as a driving connection between a rotatable part of an internal combustion engine and some accessory driven thereby, as for example, a supercharger.

The friction clutch mechanism of the present invention is interposed between the annular gear member 14 and the drive shaft 6, and preferably includes a central member 20 which, in the form shown, is in the nature of a thin disc extending radially outward from the shaft 6 and integral therewith, the disc having riveted or otherwise secured to its opposite faces a pair of discs 21 and 22 fabricated of suitable material to provide the desired frictional driving qualities. It will be seen that the friction disc 22 abuts the inner surface of the gear plate 12 while the other friction disc 21 is contacted by an axially movable annular plate 24 having its outer circumferential surface provided with a coarse helical groove or thread 26 registering with a similar thread formed on the inner circumferential surface of gear 14, whereby rotation of the plate 24 relatively to the gear causes said plate to move toward or away from the friction disc 21.

The speed responsive means operating to vary the torque capacity of the clutch mechanism in accordance with variations in speed preferably comprises a plurality of rotating L-shaped weights 29 each having a portion 30 of considerable mass, and also having an arm 31 extending from the portion thereof at right angles, the arms 30 being disposed at the greater radial distance from the axis of the drive shaft 6. These weights 29 are mounted in a novel manner to produce a novel method of controlling the frictional pressure of the plate 24 on the clutch discs 21 and 22, as will now be described.

Figures 2, 3:
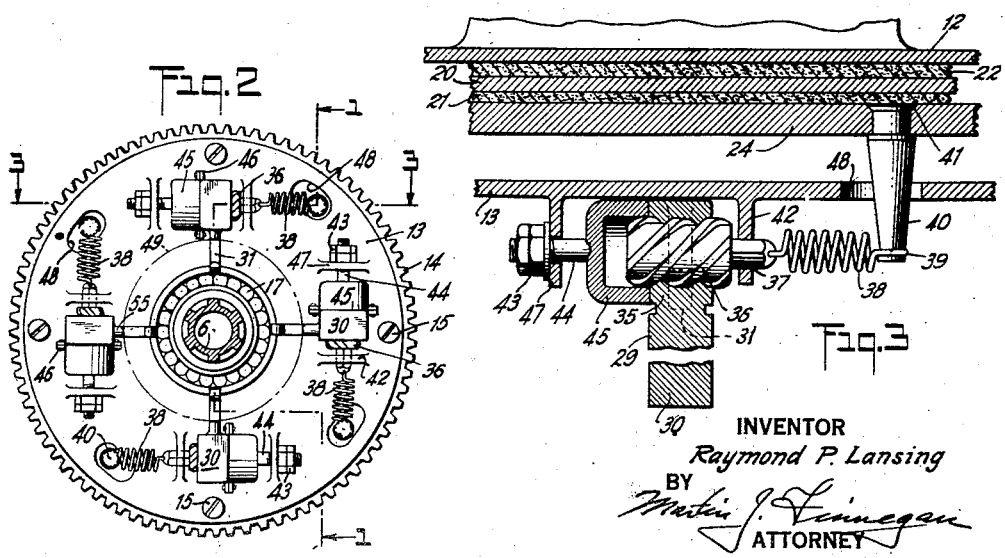
Fig. 2 is an elevation view at right angles to the viewpoint of Fig. 1.
Fig. 3 is a fragmentary sectional plan along the line 3—3 of Fig. 2.

The novel mounting and operating means for each weight 29 preferably comprises a coarsely threaded central opening through the hub poriton 35 of each weight, as shown best in Fig. 3, into which threaded portion there is inserted a correspondingly externally threaded screw member 36 having an outer end 37 reduced to a squared cross-section adapted to be slidably supported in a guide member 42 depending from plate 13 and also adapted to receive one end of a coil spring 38, the opposite end of which is hooked around and secured within a groove 39 of a conical pin or stud 40, the base of the latter being flared outwardly, as indicated at 41, to maintain itself in place in the annular plate 24. Each of the weights 29 is further provided with adjusting means 43 surrounding the reduced threaded end 44 of the cup members 45, the latter having ears 46 for attachment to the corresponding weights 29. The cups 45 are in turn partly supported by their engagement with apertured lugs 47 extending from and preferably integral with, the plate 13. It will be further noted that the plate 13 is provided with arcuate slotted portions 48 (Fig. 2) of sufficient length to allow limited oscillation of the studs 40 therein.

The manually operable means for controlling the release of the clutch when it is desired to completely disconnect the gear 14 from the drive shaft 6 may take any suitable form, but as herein shown comprises a ball bearing thrust collar 49 held in place on a sleeve 50 which is movable axially of the hollow shaft 6 through actuation of a shifter member 51 of any suitable construction embodying yoke arms 52 engageable with a collar 53 on the sleeve 50 to move the collar 49 to the right, as viewed in Fig. 1, into engagement with the rounded ends of the arms 31 to maintain the weights in the position of Fig. 4, wherein they are nearer the center of shaft 6 than in the position indicated in Fig. 1.

In operation, the tendency of springs 38 is to pull the associated screw members 36 out of the sockets of the weights 29 and thereby swing such weights inwardly by reason of the screw action between the members 36 and the sockets 35, such inward swinging being limited as determined by engagement of the knobs 55 with the surface of collar 49. Thereafter, further movement of the screws 36 being prevented, the tension in springs 38 becomes effective to pull the studs 40 toward the ends of the slots 48, thus exerting a force on the plate 24, which, by virtue of its threaded connection with the gear 14, causes the plate to move axially into firmer engagement with the friction discs 21 and 22, and thereby applies to the clutch a pressure of predetermined value as fixed by the position of the adjusting nuts 43. Now, for a particular speed or a certain position of weights 29, any increase in the coefficient of friction of the driving surfaces 21 and 22, resulting possibly from clutch slippage or heating of the parts, will tend to produce an increase in the torque transmitting capacity and thus cause the disc 21 to carry the plate 24 around with it against the tension of the spring 38 thereby changing the axial position of plate 24. Thus any tendency of the friction discs to increase their inherent torque transmitting capacity results in a release of the lateral pressure thereon sufficient to offset such tendency and maintain the torque transmitting capacity substantially constant the coacting surfaces of plate 12 and disc 22 preferably having slightly less torque capacity than the coacting surfaces of plate 24 and disc 21 in order that the member 20 may slip relative to the member 22 and be carried with the plate 24 in the manner described.

In the event of any increase in the speed of rotation of the parts, the resulting increase in the centrifugal force applicable on the weights 29 will cause them to move outwardly, thereby screwing the members 36 into the socket 35 and thus applying a greater tension to the springs 38. This action places more pressure on the clutch discs 21 and 22 thereby increasing the torque transmitting capacity of the clutch in direct mathematical ratio to the increase in the speed of the parts. The reverse action will of course occur in the event of a decrease in speed.

There is thus disclosed a novel, compact apparatus which is efficient in operation and which constitutes a driving connection capable of maintaining proper torque capacity regardless of variation in the inherent friction characteristics of the driving surfaces.

While the embodiment of the invention herein illustrated is of decided practical merit, it is to be understood that various changes may be made in the construction, arrangement and interrelation of the parts constituting the invention without departing from the spirit thereof, the extent of the included variations being ascertainable by reference to the appended claims.

What is claimed is:

1. In a device of the class described, a driving member, a driven member, means for drivably connecting said driven member with said driving member, speed responsive means mounted on and rotatable with said driven member, and means under the influence of said speed responsive means for controlling the torque transmitting capacity of said connecting means, said controlling means comprising a helical member interposed between said speed responsive means and said connecting means for producing limited relative movement between the latter and said driven member when the torque is increased beyond a predetermined amount.

2. In a device of the class described, a driving member, a driven member, a friction clutch mechanism interposed between said driving and driven members, means for limiting the maximum torque transmitting capacity of said clutch comprising a member normally rotating in unison with said driven member but capable of limited rotary movement relative thereto, means for translating any rotary movement between said last named member and said driven member into an axial movement effective to vary the lateral pressure on the friction members of said clutch, resilient means for restricting rotary movement of the member, and speed responsive means for controlling the resilient means.

3. In a device of the class described, a driving member, a driven member, a friction clutch mechanism interposed between said driving and driven members, means for limiting the maximum torque transmitting capacity of said clutch comprising a member normally rotating in unison with said members but capable of limited rotary movement relative thereto, means for translating any rotary movement between said last named member and said driven member into axial movement effective to vary the lateral pressure on the friction members of said clutch, said last named means comprising cooperating helical formations on said driven and clutch controlling members, resilient means for resisting rotary movement of the rotary member, and speed responsive means for controlling the resilient means.

4. In a device of the class described, a driving member, a driven member, a friction clutch mechanism interposed between said driving and driven members, means for limiting the maximum torque transmitting capacity of said clutch comprising a member normally rotating in unison with said members but capable of limited rotary movement relative thereto, means for varying the lateral pressure on the friction members of said clutch, said last named means comprising cooperating helical formations on said driven and clutch controlling members, and speed responsive means for effecting relative rotation between said driven and clutch controlling members.

5. In a device of the class described, a driving member, a driven member, a friction clutch interposed between said driving and driven members and constituting a driving connection therebetween, means for limiting the maximum torque transmitting capacity of said clutch comprising a plate engageable laterally therewith and normally rotating in unison with said driven member but rotatable relatively thereto and adapted to move longitudinally with respect to said clutch in response to any relative rotary movement between said plate and driven member, and means including centrifugal weights on the driven member for controlling rotary movement of the plate.

6. In a device of the class described, a driving member, a driven member, a friction clutch interposed between said driving and driven members and constituting a driving connection therebetween, means for limiting the maximum torque transmitting capacity of said clutch comprising a plate engagable laterally therewith and normally rotating in unison with said driven member but rotatable relatively thereto and adapted to move longitudinally with respect to said clutch in response to any relative rotary movement between said plate and driven member, means for limiting the extent of relative rotary movement between said plate and driven member and thereby limiting the range of longitudinal movement of said plate, and means including centrifugal weights on the driven member for controlling rotary movement of the plate.

7. In a device of the class described, a driving member, a driven member, a friction clutch interposed between said driving and driven members and constituting a driving connection therebetween, means for limiting the maximum torque transmitting capacity of said clutch comprising a plate engageable laterally therewith and normally rotating in unison with said driven member but adapted to move longitudinally with respect to said clutch in response to any relative rotary movement between said plate and driven member, and means for limiting the extent of relative rotary movement between said plate and driven member and thereby limiting the range of longitudinal movement of said plate, said limiting means comprising a member projecting from said plate in parallelism with its axis of rotation and adapted to engage a slotted portion of said driven member upon predetermined movement relative thereto.

8. In a device of the class described, a driving member, a driven member, a friction clutch interposed between said driving and driven members and constituting a driving connection therebetween, means for limiting the maximum torque transmitting capacity of said clutch comprising a plate engageable laterally therewith and normally rotating in unison with said driven member but adapted to move longitudinally with respect to said clutch in response to any relative rotary movement between said plate and driven member, means for limiting the extent of relative rotary movement between said plate and driven member and thereby limiting the range of longitudinal movement of said plate, said limiting means comprising a member projecting from said plate in parallelism with its axis of rotation and adapted to engage a slotted portion of said driven member upon predetermined movement relative thereto, and resilient means normally restraining said projection from partaking of any such relative movement.

9. In a device of the class described, a driving member, a driven member, a friction clutch interposed between said driving and driven members and constituting a driving connection therebetween, means for limiting the maximum torque transmitting capacity of said clutch comprising a plate engageable laterally therewith and normally rotating in unison with said driven member but adapted to move longitudinally with respect to said clutch in response to any relative rotary movement between said plate and driven member, means for limiting the extent of relative rotary movement between said plate and driven member and thereby limiting the range of longitudinal movement of said plate, said limiting means comprising a member projecting from said plate in parallelism with its axis of rotation and adapted to engage a slotted portion of said driven member upon predetermined movement relative thereto, and speed responsive means tending to oppose such relative movement.

10. In a device of the class described, a driving member, a driven member, a friction clutch interposed between said driving and driven members and constituting a driving connection therebetween, means for limiting the maximum torque transmitting capacity of said clutch comprising a plate engageable laterally therewith and normally rotating in unison with said members but adapted to move longitudinally with respect to said clutch in response to any relative rotary movement between said plate and driven member, means for limiting the extent of relative rotary movement between said plate and driven member and thereby limiting the range of longitudinal movement of said plate, and speed responsive means tending to oppose such relative movement, said speed responsive means comprising a weighted member pivotally supported on said driven member and operatively connected to said resilient means.

11. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said driven member but adapted to move longitudinally with respect to said clutch in response to any relative movement between said plate and driven member, means for limiting the extent of relative rotary movement between said plate and driven member and thereby limiting the range of longitudinal movement of said plate, said limiting means comprising a member projecting from said plate in parallelism with its axis of rotation and adapted to engage a slotted portion of said driven member upon predetermined movement relative thereto, in a direction to reduce the torque capacity, resilient means normally restraining said projection from partaking of any such relative movement, and speed responsive means for varying the force of said resilient means in tending to oppose such relative movement, said means comprising weights operatively connected to a member movable in a line parallel to the plane of said plate and operatively connected to said projection through said resilient means.

12. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said driven member but adapted to move longitudinally with respect to said clutch in response to any relative rotary movement between said plate and driven member, and speed responsive means tending to effect such relative movement, said means comprising a member movable in a line parallel to the plane of said plate means, and means for producing movement of said member along said parallel line.

13. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said members but adapted to move longitudinally with respect to said clutch in response to any relative rotary movement between said plate and one of said members, resilient means normally restraining said plate from partaking of any such relative movement in a torque reducing direction, speed responsive means for varying the force of said resilient means in tending to oppose such relative movement, said means comprising weights and a member movable by said weights in a line parallel to the plane of said plate said movable member being operatively connected to said plate through said resilient means, said centrifugal weights being supported on one of said members for rotation therewith and also capable of rotation about an axis coinciding with the line of movement of said resilient means.

14. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said members but adapted to move longitudinally with respect to said clutch in response to any relative rotary movement between said plate and members, and helical means mounted on one of said members for controlling such relative rotary movement of said plate and member in response to variations in the speed of the driven member.

15. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said members but adapted to move longitudinally with respect to said clutch in response to any relative rotary movement between said plate and one of said members, and means mounted on one of said members for causing such relative rotary movement of said plate and member in response to variations in the speed of the driven member, said means comprising a member connected to both said member and said plate at angularly spaced points in the planes of said two members, and means for varying the distance between said angularly spaced points in response to variations in the speed of said driven member.

16. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said members but adapted to move longitudinally with respect to said clutch in response to any relative rotary movement between said plate and members, means connected to both said driven member and plate at angularly spaced points in the planes of said two members, and means for varying the distance between said angularly spaced points in response to speed of said driven member, said means comprising cooperating threaded members constituting part of said connecting means, said threaded members being capable of relative axial movement in response to variations in the speed of the driven member.

17. In a device of the class described, a driving member, a driven member, a friction clutch interposed between said driving and driven members and constituting a driving connection therebetween, means for varying the torque transmitting capacity of said clutch comprising a plate engageable laterally therewith and normally rotating in unison with said driving member but adapted to move longitudinally with respect to said clutch in response to any relative rotary movement between said plate and driven member, means connected respectively to both said driven member and plate at angularly spaced points in the planes of said two members, means for varying the distance between said angularly spaced points in response to speed of said driven member, said means comprising threaded members constituting part of said connecting means, said threaded members being capable of relative axial movement in response to variations in the speed of the driven member, and resilient means constituting part of the connecting means operatively connected to said threaded members and tending to separate the threaded members.

18. In a friction transmission mechanism, in combination a driving shaft, a driven shaft, means responsive to driven shaft speed only for varying the torque transmitting capacity of said mechanism, and cooperating means responsive to variations in the frictional coefficient for maintaining the torque transmitting capacity constant at any given speed of the driven shaft.

19. In a friction transmission mechanism, in combination a driving shaft, a driven shaft, centrifugal means operatively secured to the driven shaft for varying the torque transmitting capacity of said mechanism in accordance with driven shaft speed only, and cooperating means responsive to variations in the frictional coefficient for maintaining the torque transmitting capacty constant at any given speed of the driven shaft.

20. In a friction transmission mechanism, in combination, a driving member, a driven member, said driving member being adapted to transmit a constant torque to said driven member, and means responsive to variations in the frictional coefficient for nullifying any increase from said constant torque transmitting capacity, except such increase as results from variations in the speed of said driven member.

21. In a friction transmission mechanism of the friction type, in combination a driving shaft, a driven shaft, means responsive to driven shaft speed only for varying the torque transmitting capacity of the friction elements, and means responsive to variations in the frictional coefficient cooperating with said speed responsive means for maintaining the torque transmitting capacity constant at any given speed of the driven shaft.

22. In a transmission mechanism, in combination, a driving member, a driven member, said driving member being frictionally connected with said driven member and being normally adapted to transmit a constant torque to said driven member, and means responsive to variations in the frictional coefficient for nullifying any deviation from said constant torque transmitting capacity, except such deviations as result from variations in the speed of said driven member.

RAYMOND P. LANSING.